United States Patent [19]

Hagemeyer et al.

[11] Patent Number: 4,533,287

[45] Date of Patent: Aug. 6, 1985

[54] CUTTER HEAD WITH LOCKING PRESSURE INDICATOR

[75] Inventors: Kenneth L. Hagemeyer; Vernon W. Pearson, both of Rockford, Ill.

[73] Assignee: Ex-Cell-O Corporation, Troy, Mich.

[21] Appl. No.: 569,691

[22] Filed: Jan. 10, 1984

Related U.S. Application Data

[63] Continuation of Ser. No. 310,171, Oct. 9, 1981, abandoned.

[51] Int. Cl.³ .............................................. B23C 5/26
[52] U.S. Cl. ........................................ 409/234; 279/4; 409/236
[58] Field of Search ............... 409/234, 236, 209, 210, 409/214, 218; 407/23; 279/2 A, 4; 408/239 R, 239 A

[56] References Cited

U.S. PATENT DOCUMENTS 3,516,361  6/1970  Cox ........................................ 279/4
4,244,248  1/1981  Adell et al. ..................... 409/234 X Primary Examiner—Z. R. Bilinsky
Attorney, Agent, or Firm—Edward J. Timmer

[57] ABSTRACT

A tool cutter head of the type having fluid pressure locking means to hold the cutter head on a spindle includes locking pressure indicator means providing visual verification to a machine operator that proper locking pressure is applied.

1 Claim, 5 Drawing Figures

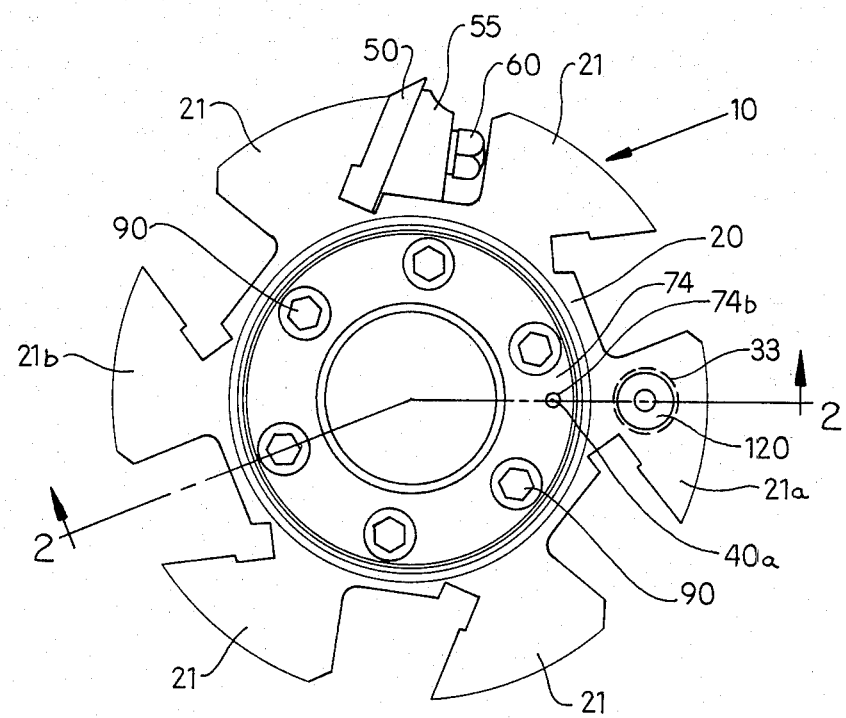
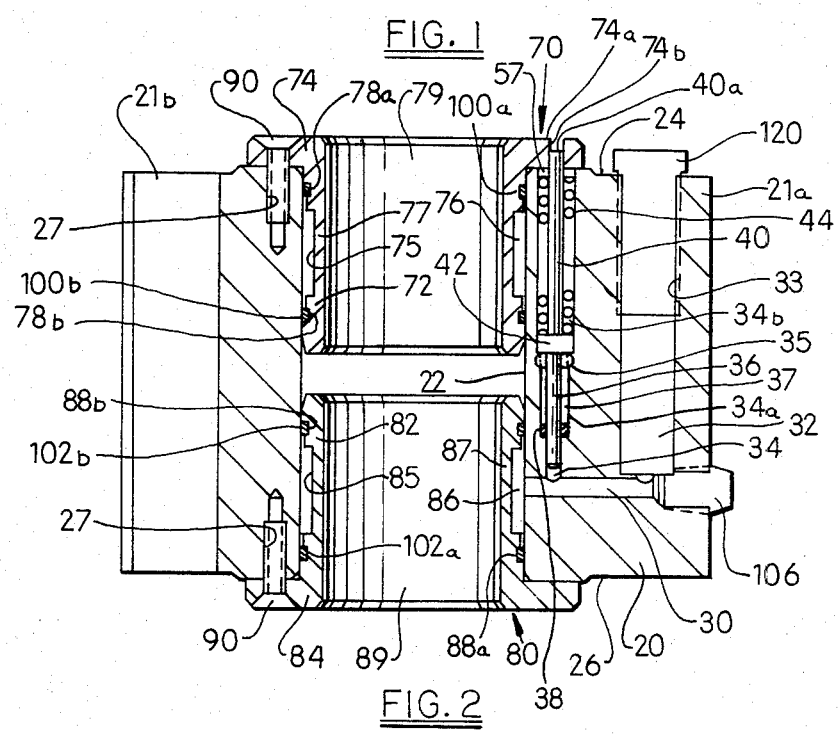

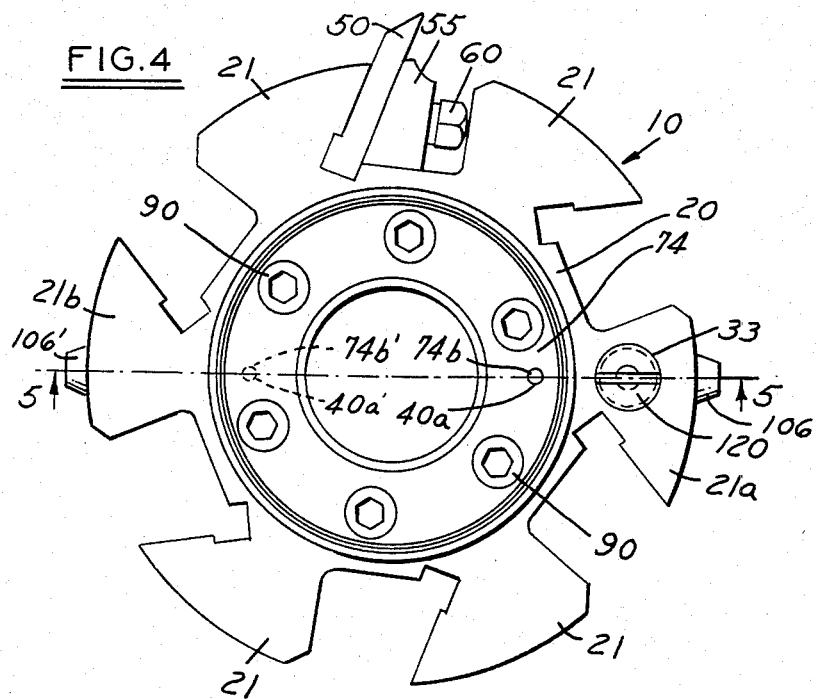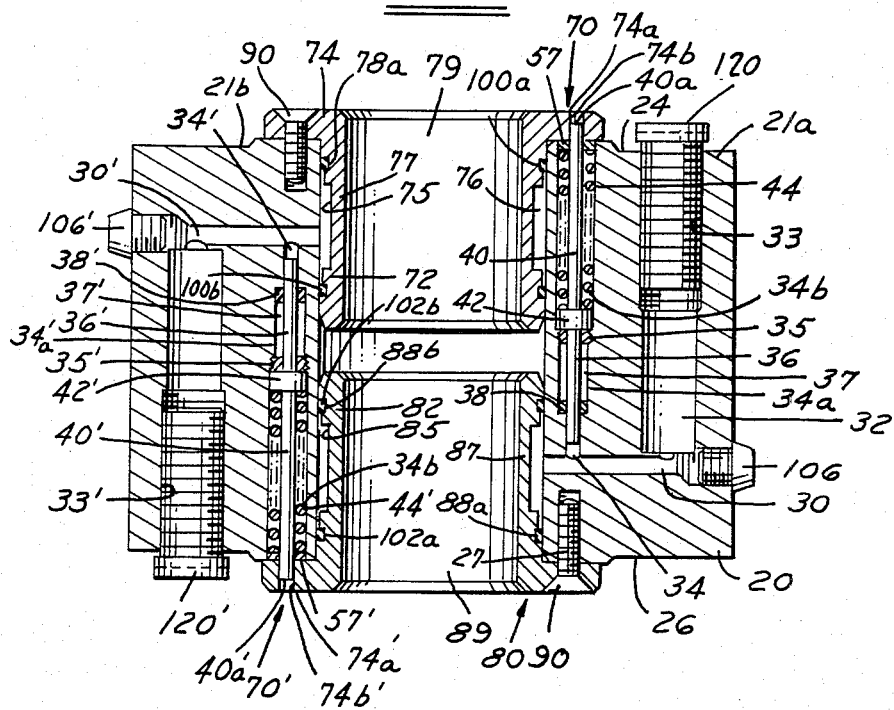

CUTTER HEAD WITH LOCKING PRESSURE INDICATOR

This application is a continuation of application Ser. No. 310,171, filed 10/9/81, now abandoned.

FIELD OF THE INVENTION

The present invention relates to a tool cutter head and more particularly to a tool cutter head which is fluid pressure locked onto a machine tool spindle for rotation therewith.

BACKGROUND OF THE INVENTION

In the past, the furniture manufacturing industry has used tool cutter heads of the milling type carrying a plurality of form cutter blades specially shaped to impart a scroll-like or other intricate ornamental design to a wooden workpiece. Usually, a plurality of cutter heads are individually mounted on a machine tool arbor or spindle by expandable locking collars inserted into opposite ends of the spindle-receiving bore of each cutter head. The locking collars include a tubular portion that extends into the cutter head bore and a radial flange which is fastened to the end of the cutter head. The tubular portion of each collar cooperates with the wall forming the spindle-receiving bore to provide a chamber into which a fluid pressure medium, typically grease, is introduced under suitable pressure to expand the locking collar against the spindle and thereby lock the cutter head on the spindle.

Typically, the cutter head includes a radially extending main fluid pressure supply bore in communication at one end with the fluid pressure chamber of the locking collar and terminating at the other end in a grease fitting through which grease is introduced into the bore. Pressure on each locking collar is controlled by individual threaded set screws on opposite ends of the cutter head received in axial bores extending from each main supply bore. The set screws are simply advanced or withdrawn in their respective axial bores in the manner of a piston to adjust the locking pressure to a preselected value determined empirically to be sufficient for fixing the cutter head on the spindle but limited so as not to damage or deform the components.

A problem experienced in the past with this type of cutter head locking arrangement has been associated with gradual loss of locking pressure over time to a level which is insufficient to lock the cutter head firmly on the spindle and the lack of a means on the cutter head for indicating to a machine operator that this pressure loss has occurred. As a result, machine operators have started cutter machines with insufficient locking pressure applied on one or more cutter heads. In this situation, the affected cutter head does not rotate with the spindle and has severely galled the spindle and may even damage adjacent cutter heads, causing costly repairs and down time. What is needed is a means by which the machine operator can verify whether the locking pressure is being maintained at the preselected value from one day to the next or from one manufacturing run to the next to insure that each cutter head is properly locked to the spindle.

SUMMARY OF THE INVENTION

It is an object of the present invention to provide a tool cutter head of the locking type described with locking pressure indicator means by which a machine operator can visually verify whether the proper preselected locking pressure is being applied.

It is another object of the invention to provide a cutter head with locking pressure indicator means capable of providing required verification continuously over periods of time so that an operator merely has to visually check the indicator means from one day or production run to the next to determine if the cutter head is properly locked on the spindle.

It is another object of the invention to provide a cutter head with locking pressure indicator means providing an easily recognizable indication to an operator that proper locking pressure is present.

It is still another object of the invention to provide a cutter head with locking pressure indicator means which is rugged in construction to withstand the forces present during machining and which does not interfere with operation of the cutter head.

In accordance with a typical embodiment of the invention, the tool cutter head includes a pressure-responsive indicator means disposed in a bore which is in fluid pressure communication with fluid pressure means applying a preselected locking pressure to hold the cutter head on a spindle. The cutter head bore opens at one end to an external cutter head surface and visible reference marker means is provided on the cutter head in the vicinity of the open bore end. The pressure-responsive indicator means is movable in the bore relative to the reference marker means in response to changes in locking pressure. Means is provided for biasing the movement of the pressure-responsive indicator means such that the indicator means is positioned in a predetermined visually recognizable relation with the reference marker means on the cutter head when the locking pressure is maintained at the preselected value. Preferably, the biasing means locates the pressure-responsive indicator means coincident with the reference marker means when preselected locking pressure is applied. Visual verification is thereby provided to a machine operator that the cutter head is properly locked on the spindle.

In a preferred embodiment, the cutter head bore opens to an external axial end of the cutter head and locking collar means is provided having a flange fastened to that end of the cutter head. The locking collar flange includes an aperture in axial alignment with the open bore of the cutter head and an outer reference marker surface around the aperture. The pressure-responsive indicator means in the bore is biased to extend into the flange aperture flush with the outer flange reference marker surface to visually verify that the proper preselected locking pressure is applied.

BRIEF DESCRIPTION OF THE DRAWINGS

FIG. 1 is an end elevation of the cutter head of the invention.

FIG. 2 is a cross-sectional view of the cutter head along line 2—2.

FIG. 4 is an end elevation of the cutter head showing both locking pressure responsive indicator means.

FIG. 5 is a cross-sectional view along line 5—5 of FIG. 5.

DESCRIPTION OF THE PREFERRED EMBODIMENTS

Figure 3:
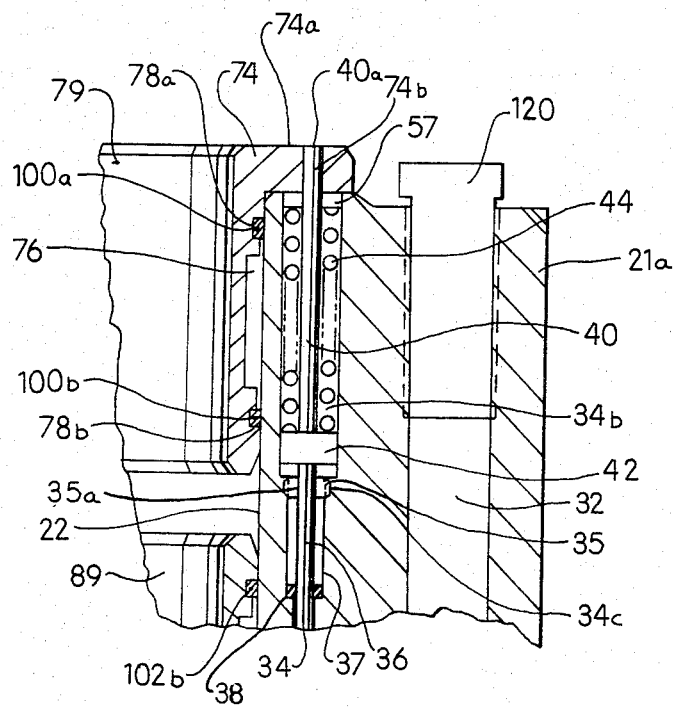
FIG. 3 is partial cross-sectional view showing the pressure indicator shaft flush with the flange of the locking collar.

Referring to FIGS. 1-3, a preferred tool cutter head 10 for milling a pattern or design in a wooden workpiece is shown. The cutter head includes a generally tubular cutter body 20 having a plurality of radially extending arms 21 with conventional form cutter blades 50 each fastened to an arm by clamp 55 and machine screw 60 as is well known in the art, only one set of which is shown. The cutter blades are shaped to impart an intricate design or pattern to a wooden workpiece such as the leg of a table or the like as is also well known.

The cutter body 20 includes a central axial bore 22 adapted to receive the locking collars 70 and 80 at opposite ends. The locking collars have tubular portions 72 and 82 extending into the bore 22 and radial flanges 74 and 84 fastened to the opposite axial ends 24 and 26, respectively, of the cutter body by machine screws 90 received in threaded holes 27 in the cutter body.

As can be seen most clearly in FIG. 2, annular grooves 75 and 85 are machined in the tubular portions of the locking collars and form annular fluid pressure receiving chambers 76, 86 when the tubular portions are inserted in the cutter body bore 22. These chambers are adapted to receive a fluid pressure medium such as grease at a preselected pressure to cause cylindrical walls 77, 87 of the tubular portions to expand against the spindle (not shown) received in the bores 79, 89 of the collars and thereby lock the cutter head to the spindle for rotation therewith. Smaller annular grooves 78a, 78b and 88a, 88b are provided on opposite sides of main grooves 75, 85, respectively, to receive sealing o-rings 100a, 100b and 102a, 102b to prevent loss of fluid pressure from the chambers.

The cutter body 20 includes a pair of fluid pressure means for supplying grease at the preselected locking pressure to the annular chambers 76, 86. The fluid pressure means are the same in construction and differ only in their orientation on the cutter body. Consequently, only the fluid pressure means supplying chamber 86 will be described in detail. In particular, the fluid pressure means for chamber 86 includes a main radial supply bore 30 in the cutter body in fluid pressure communication at one with chamber 86 and terminating in a conventional grease fitting 106 at the outer end. A first axial bore 32 is provided and extends through arm 21a from the main bore to the axial end 24 of the cutter body, terminating in an open threaded end 33. It is apparent that open threaded end 33 is on the opposite axial end of the cutter body from the associated locking collar 80. A threaded set screw 120 is received in threaded end 33. Expansion of locking collar 80 against the spindle is effected simply by injecting grease through the fitting 106, through main bore 30 and into chamber 86 where the pressure will expand wall 87. Of course, grease also enters axial bore 32. Adjustment of the locking pressure to the preselected value is effected simply by advancing or withdrawing set screw 120 in the manner of a first piston means. Set screw 120 allows the pressure in chamber 86 to be adjusted to the preselected locking value without danger of damaging or deforming the spindle or collar from excessive pressure. Of course, the locking pressure selected will depend upon the cutting application encountered, feed rate, etc. and can be determined empirically by those skilled in the art. In Applicants' cutting operation, the locking pressure was selected to be 6500 psi.

It will be apparent that an axial bore and associated set screw (not shown) the same as those shown for chamber 86 in FIG. 2 are provided for chamber 76. This other bore and set screw, however, will extend through an opposite arm 21b in the opposite axial direction from those described, i.e. toward the axial end 26 in FIG. 2 which end is opposite the cutter head end where associated locking collar 70 having chamber 76 is positioned. Of course, the associated set screw will be accessible on axial end 26 for controlling locking pressure in chamber 76. This arrangement of bores and set screws optimizes use of the available space on the cutter body.

According to the present invention, locking pressure indicator means are provided for the locking collars 70, 80. Only the locking pressure indicator means for collar 80 will be described since the other is identical in construction except for orientation in the opposite direction on the cutter body 20. In particular, the locking pressure indicator means for collar 80 includes a second axial bore 34 extending from the main supply bore 30 to the external end surface 24 of the cutter body where it is open. The second bore 34 includes a small diameter section 34a and larger diameter section 34b. A hexagonal jam screw 35 is externally threaded and seated in a threaded intermediate bore section 34c, FIG. 3, at the junction of the small and large diameter sections 34a and 34b and has a central passage 35a through which a dowel pin 36 can slide in the nature of a pressure-responsive second piston means in response to changes in locking pressure in chamber 86. The pin 36 is slideably disposed in a fixed sleeve 37 positioned in the bore section 34a. Loss of fluid pressure through bore 34 is prevented by sealing o-ring 38 positioned around the pin 36 adjacent the jam screw.

An indicator shaft 40 having an enlarged head 42 is slideably disposed in larger diameter bore section 34b and moved axially in response to movement of the pin 36 due to locking pressure changes. As is apparent, a coil compression spring 44 is also disposed in bore section 34b with one end abutting the enlarged head 42 and the other seated against a washer 57 fitted in bore 34b. The spring exerts an axial force on head 42 and in turn against movement of pin 36 in the upward direction in FIG. 2. An important feature of the invention is that the spring force is selected in relation to the cross-sectional area of dowel pin 36 to bias the outer end 40a of indicator shaft 40 coincident or in a flush position with outer flange reference surface 74a of locking collar 74 when the locking pressure in chamber 86 is maintained at the preselected locking value (see FIG. 3). It is apparent that radial flange surface 74a is provided with aperture 74b aligned axially with cutter body bore and indicator shaft 40. It is also apparent that the outer flange surface 74a thus in effect functions as visible reference marker means on the cutter head around aperture 74b so that a machine operator can visually verify that locking pressure is at the preselected value simply by determining whether indicator shaft end 40a is flush with flange reference surface 74a. If the locking pressure is below the preselected value for example as a result of leakage of pressure fluid over time, the indicator shaft end 40a will be positioned below flange reference surface 74a recessed in aperture 74b due to the biasing action of spring 44 on dowel pin 36. Conversely, if locking pressure exceeds the preselected value, the shaft end 40a will extend out of flange aperture 74b past flange reference surface 74a. In the former instance, the machine operator will be advised to advance set screw 120 in first axial bore 32 prior to machine start-up to increase locking pressure in chamber 86 to the preselected value. In the latter instance, the operator will back-off the set screw 120 to relieve locking pressure so as to avoid damaging the spindle and locking collar and yet maintain proper locking pressure.

Of course, radial flange 84 at the opposite end of the cutter head will be provided with a similar aperture and outer reference marker surface to cooperate with the pressure indicator means for fluid pressure chamber 76 which, as mentioned above, will have the same construction as the pressure indicator means described for chamber 86 as shown in FIGS. 4 and 5 where like numerals primed represent like features.

Calibration of the locking pressure indicator means is accomplished during manufacture of the cutter head by providing the indicator shaft (i.e. shaft 40) with a longer shaft length than is necessary, applying the preselected locking pressure to the associated locking collar and grinding off the shaft length until the shaft end is flush with the associated flange reference surface.

It will be apparent to those skilled in the art that the present invention provides an improved cutter head satisfying the need in the art for visual verification that the cutter head is locked on the spindle at a proper preselected locking pressure prior to machine start-up and from one production run to the next over extended periods. And, it will be apparent these advantageous features are achieved without interfering with the operation of the cutter head in the working environment.

While certain preferred embodiments of the invention have been illustrated and described, it will be understood by those skilled in the art that various changes and modifications may be made therein. For example, the pressure indicator means may be received in a secondary bore in the locking collars rather than in the cutting body. The pressure-responsive indicator means may possibly be incorporated in the set screw controlling the locking pressure. The reference marker means cooperatively associated with the pressure-responsive indicator shaft could take various forms and be provided on the cutter head at other locations and need not necessarily be associated with the flange of a locking collar. Of course, it is possible that a single fluid pressure means and a single pressure-responsive indicator means may be employed to apply and verify locking pressure to both locking collars or to a single locking collar. Furthermore, it will be apparent that the second piston means (dowel pin) and spring biasing means may be arranged in different working relations and still achieve the objects and advantages of the invention. It should also be apparent that the tool cutter head may be adapted for machining of other materials using other types of cutting blades or other tool means. Of course, it is intended that these and other changes and modifications may be made by those skilled in the art without departing from the spirit and scope of the invention as covered in the appended claims.

We claim:

1. In a tool cutter head of the type for mounting on a machine tool spindle and having a cutter body with first and second axial ends and a central bore therebetween, a first locking collar adjacent the first axial end and a second locking collar adjacent the second axial end with each locking collar having a radial flange portion fastened to the adjacent axial end and an expandable fluid pressure receiving portion extending partially into the central bore at that end expandable by fluid pressure to lock the cutter body to the spindle, and fluid pressure means in the cutter body for applying a preselected locking pressure to the fluid pressure receiving portions, the improvement comprising portions of said cutter body forming a first axial bore in fluid pressure communication with the first locking collar fluid pressure receiving portion adjacent said first axial end and extending axially therefrom to the opposite second axial end where the first bore terminates in an open end beneath the flange of said second locking collar, other portions of said cutter body forming a second axial bore in fluid pressure communication with the second locking collar fluid pressure receiving means adjacent said second axial end and extending axially therefrom to the opposite first axial end where the second bore terminates in an open end beneath the flange of said first locking collar, portions of the first and second locking collar flanges forming apertures coaxially aligned with the open bores therebeneath and also forming outer reference surfaces around the apertures, first and second pressure indicator means sealingly disposed in the respective open bores and movable through the coaxially aligned flange apertures in response to changes in locking pressure and first and second spring means in the respective open bores for biasing movement of the first and second pressure indicator means such that said first indicator means is positioned coincident with the second locking collar flange reference surface and the second indicator means is positioned coincident with the first locking collar flange reference surface when locking pressure is at the preselected value, whereby the first pressure indicator means together with the second locking collar flange reference surface display locking pressure for the first locking collar at the second axial end opposite from said first locking collar and the second pressure indicator means together with the first locking collar flange reference surface display locking pressure for the second locking collar at the first axial end opposite from said second locking collar.

* * * * *